Feb. 12, 1935.  B. J. HASKINS  1,990,486
CONDENSER RESISTANCE TESTER
Filed Nov. 18, 1933

Inventor:
Butler J. Haskins,
By Benning & Benning
Attys.

Patented Feb. 12, 1935

1,990,486

UNITED STATES PATENT OFFICE 1,990,486

CONDENSER RESISTANCE TESTER

Butler J. Haskins, Chicago, Ill., assignor to Joseph Weidenhoff, Inc., Chicago, Ill., a corporation of Illinois Application November 18, 1933, Serial No. 698,559

8 Claims. (Cl. 175—183)

An object of this invention is to provide a ready means for testing the resistance of a condenser.

Another object is to provide a combination of the resistance tester with other ignition testing mechanism for testing spark coils and to consolidate the whole into a compact unit, and one which lends itself readily to manufacture.

Another object is to provide a motor for driving a breaker mechanism which automatically corrects for differences in voltage in the storage battery driving the motor, so that the resulting sparks at the spark gap are substantially of equal intensity for different battery voltages.

These and other objects, as will hereinafter appear, are accomplished by this invention which is fully described in the following specification and shown in the accompanying drawing in which—

Figure 1:
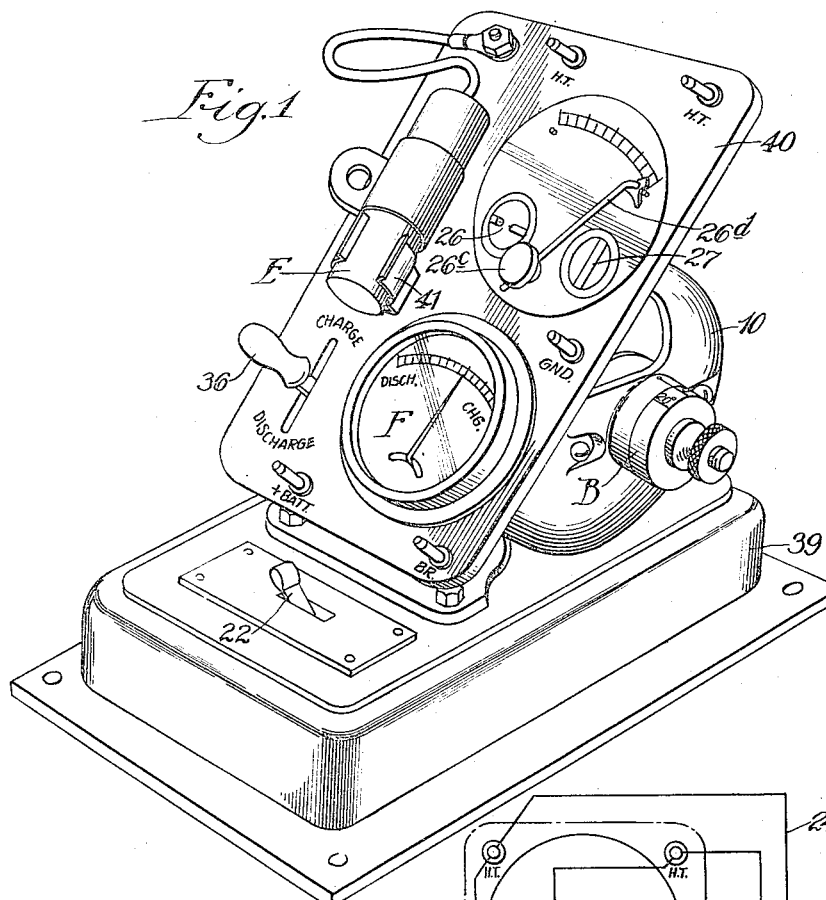
Figure 2:
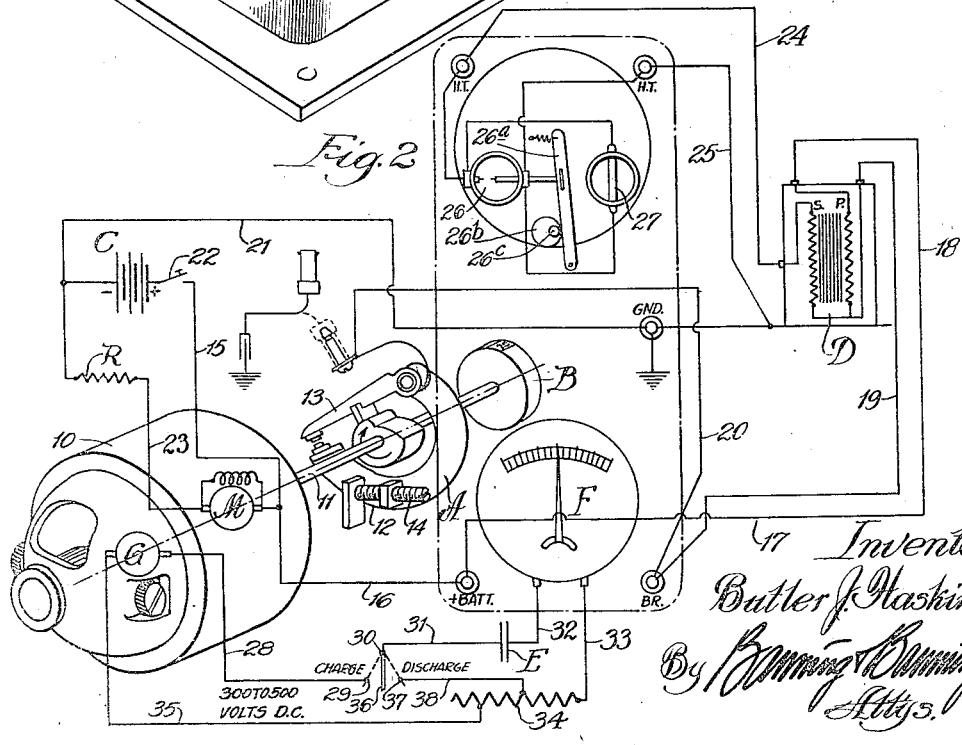

Figure 1 is a perspective view of a unit combining my condenser resistance tester with ignition testing apparatus; and Fig. 2 is a schematic diagram of the same.

The embodiment illustrated comprises essentially a motor generator 10 having a shaft 11 on which is mounted a make and break mechanism A, which is shown and described in detail in my pending application for Compensated coil testing apparatus, Serial No. 664,466, filed April 5, 1933. This apparatus permits the operator to set the make and break mechanism to open and close the primary circuit through the spark coil to correspond to certain marks on a collar B adjustably mounted on the end of the shaft 11. These marks are preferably set to correspond to an arc of 20° of movement of the cam during which the breaker points are closed. That is, these points mark the points of closing and opening of the breaker points on the cam.

This coil testing apparatus includes the breaker A which has a relatively fixed plate 12 and a breaker arm 13, the plate being movable with respect to the arm by means of a screw 14. A storage battery C connects through leads 15, 16, 17 and 18 with the primary coil P of a spark coil D to be tested. The opposite end of this coil connects through leads 19 and 20 with the breaker A which is grounded, completing the circuit, since the opposite side of the storage battery connects to ground through a lead 21. The storage battery C connects through a switch 22 and leads 15 and 23 with the motor M which is so wound as to compensate for differences in voltage of the storage battery by variations in the motor speed, as will hereinafter be described.

The secondary winding S of the coil D connects through leads 24 and 25 with the two sides of a spark gap 26 which is placed in parallel with a neon tube 27. The opening of the spark gap 26 is controlled by a lever 26$^a$ bearing against a cam 26$^b$ which is mounted on a shaft 26$^c$, which carries a pointer 26$^d$ (Fig. 1) which operates over a scale which indicates in millimeters the amount of opening of the spark gap. Thus, as the secondary of the coil becomes actuated due to suddenly breaking the primary current, a high potential is developed in the secondary winding which causes a spark to jump the gap 26. At the same time a flash occurs in the neon tube 27.

The condition of the spark coil D, which has preferably previously been heated to a normal operating temperature for the coil, when normally energized, is indicated by the brilliance and snap of the spark across the gap 26 and by the brilliance and general appearance of the flash in the neon tube 27.

The energization of the secondary of the spark coil D depends on the voltage of the battery C, and on the time current flows through the primary of the spark coil. The latter, however, depends on the speed of the motor M, and this in turn depends on the voltage of the battery C. Thus by designing the motor M so that its speed is substantially in proportion to the battery voltage, the speeding up of the motor due to increased battery voltage will cause the motor shaft and the cam carried thereby to rotate faster, with the result that a heavier current passes for a shorter time through the primary winding of the coil at the higher voltage. The resulting energization and the resulting spark are substantially equal to those due to the smaller current flowing for a longer period.

To accomplish this, I have made the motor M shunt wound and have preferably used a resistance R in series with the motor, this resistance being equal to approximately twenty percent of the resistance of the motor at normal speeds. Thus with the battery voltage 6 volts, the voltage across the motor terminals is 5 volts, and the speed of the motor is 1200 R. P. M. With 7 volts at the storage battery, the speed is 1500 R. P. M. In the latter case, the breaker points will be closed only eighty percent as long, but the charging current will pass through the spark coil D at a much higher amperage. The higher voltage for shorter time gives the same energization to the coil as the lower voltage for the longer time. Thus variations of voltage in the storage battery are compensated for in a very simple and efficient way, so that the resulting spark at the spark gap 26 for a given coil is about the same for a wide variation in the potential of the storage battery.

The generator portion G of the motor generator 10 connects through a lead 28 with a charging pole 29 of a double throw switch, the center pole 30 connecting through a lead 31 with a condenser E to be tested. The opposite side of the condenser connects through a lead 32 with an ohmmeter F, the return from the ohmmeter being through a lead 33 which is connected to one end of a resistance 34 which is tapped, and which connects through a lead 35 with the opposite side of the generator G. This generator preferably has a potential of 300 to 500 volts direct current.

A switch knife 36 is hingedly connected at the switch pole 30 and is adapted to make contact at one side with the charging pole 29, and on the opposite side with a discharge pole 37, the latter connecting through a lead 39 with a tap on the resistance 34. The condenser E to be tested in this instance is the usual ignition condenser which is of substantially .25 mfd. capacity.

To calibrate the ohmmeter F, a good condenser E, that is one known to have a high resistance, is connected in the circuit in the same location and the motor generator set in operation. This condenser is then charged by moving the switch lever 36 to "charge" position, and then is discharged by moving it into contact with the discharge pole 37, at the same time observing the movement of the hand of the ohmmeter. The lead 38 is then adjusted, if necessary, to bring the charge reading of the ohmmeter to practically a full scale reading when the condenser is shorted out. Having done this, the lead 38 is likewise adjusted on the resistance 34 so that the reading on "discharge" is the same as the reading for "charge".

For this purpose a damped ohmmeter is used so that the needle remains stationary long enough for its position on the scale to be readily observed. The tapped resistance or potentiometer may have a value of 300,000 to 500,000 ohms for a voltage of 300 to 500 volts. With the apparatus thus adjusted the meter F acts as a milliammeter to give comparative readings of the charging and discharging currents. Also by carefully calibrating the meter as an ohmmeter, the actual ohmic resistance of the condenser under test may be read directly on the ohmmeter scale. Thus it will be seen that I have provided a very simple and compact form of testing apparatus.

As shown in Fig. 1, the motor generator 10 may be mounted on a suitable base 39, and a panel 40 may be mounted either on the motor generator or otherwise carried by the base. A pair of clips 41 of any desired type may be used to hold the condenser E, the types of clip and condenser shown being illustrative only.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. In testing apparatus of the class described, a motor generator having a frame, a shaft journaled therein, a cam on said shaft, a plate hingedly mounted with respect to said frame, a breaker arm hingedly mounted on the hinge of said plate and insulated therefrom and having a contact point adapted to engage a contact on said plate, means for adjusting the plate contact relative to the breaker arm contact, and a cam follower adapted to bear on the cam and means urging the breaker arm towards the cam, a collar adjustably secured on the shaft and having indicia movable in front of an indicator on the frame whereby the breaker arm and collar may be adjusted to cause the breaker points to open and close at the points of the indicia on the collar, and apparatus for testing a condenser supplied by direct current from the generator.

2. In testing apparatus of the class described, an ohmmeter, means for connecting a source of direct current in series circuit with a condenser to be tested and with the ohmmeter to charge the condenser, said means including a double throw switch, and a resistance adapted to be placed in series circuit with the condenser and ohmmeter to discharge the condenser.

3. In testing apparatus of the class described, an ohmmeter, means for connecting a source of direct current in series circuit with a condenser to be tested and with the ohmmeter to charge the condenser, said means including a double throw switch and a resistance, a portion of said resistance adapted to be placed in series circuit with the condenser and ohmmeter by movement of the switch to another position to cause the condenser to discharge.

4. In testing apparatus of the class described, an ohmmeter, means for connecting a source of direct current in series circuit with a condenser to be tested and with the ohmmeter to charge the condenser, said means including a double throw switch and a resistance, said resistance adapted to be placed in series with said condenser and ohmmeter when the switch is in condenser charging position and a part of said resistance adapted to be placed in series circuit with the condenser and ohmmeter by movement of the switch to another position to cause the condenser to discharge, the values of the resistances being such that a condenser having a given internal resistance will give substantially the same reading of the ohmmeter on charge and on discharge.

5. In testing apparatus of the class described, an ohmmeter, means for connecting a source of direct current in series circuit with a condenser to be tested and with the ohmmeter to charge the condenser, said means including a double throw switch and a resistance tapped at two points, one point being adapted to be connected in series circuit with the generator in one closed position of the switch, the other point being adapted to discharge the condenser through a portion of the resistance in the other closed position of the switch.

6. In testing apparatus of the class described, a direct current electric shunt motor having a frame and adapted to be driven by a storage battery, a shaft journaled therein, a make and break device having a cam on said shaft, said make and break device being adapted to be connected in series circuit with the primary winding of a spark coil to be tested, said primary winding and make and break device in series adapted for connection across the terminals of the motor battery in parallel with the motor and a spark gap adapted to be connected in series circuit with the secondary winding of the spark coil, said motor being wound so that the motor speed will be substantially in proportion to the voltage of said storage battery whereby the spark produced at the spark gap will be of substantially the same intensity for different battery voltages while the gap remains constant.

7. In testing apparatus of the class described, a direct current electric shunt wound motor adapted to be driven by a storage battery and having a frame, a shaft journaled therein, a make and break device having a cam on said shaft, said make and break device having breaker points adapted to be connected in series circuit with the motor battery and with the primary winding of a spark coil to be tested, a spark gap adapted to be connected in series circuit with the secondary winding of the spark coil, said motor being shunt wound so that the motor speed will be substantially in proportion to the voltage of said battery whereby the amount of current flowing through the primary winding during each closure of the breaker points for a given setting will be substantially the same for different battery voltages.

8. In testing apparatus for the spark coil of ignition apparatus, a shunt wound direct-current motor, a make and break device, a cam mounted on the motor shaft for operating the make and break device, a spark coil to be tested, a spark gap in the secondary circuit of the spark coil, a storage battery, the make and break device and primary coil of the spark coil connected in series across the battery terminals, said motor connected across the battery terminals in parallel with the primary coil and make and break device so that the shunt motor and primary circuit of the coil will be subject to the same battery voltage variations.

BUTLER J. HASKINS.